United States Patent [19]

Lähdemäki et al.

[11] Patent Number: 5,450,487

[45] Date of Patent: Sep. 12, 1995

[54] ARRANGEMENT FOR THE CONTROL OF AN ECHO CANCELLER

[75] Inventors: Heimo Lähdemäki, Pirkkala; Vesa Särkikangas; Pertti Salonen, both of Helsinki, all of Finland

[73] Assignee: Nokia Telecommunications Oy, Espoo, Finland

[21] Appl. No.: 370,232

[22] Filed: Jan. 9, 1995

Related U.S. Application Data

[63] Continuation of Ser. No. 81,322, Jun. 23, 1993, abandoned.

[30] Foreign Application Priority Data

Nov. 4, 1991 [FI] Finland ................ 915201

[51] Int. Cl.⁶ ............................................. H04B 3/20
[52] U.S. Cl. ................... 379/410; 379/402; 379/406; 379/407; 379/408; 379/411; 370/32; 370/32.1
[58] Field of Search ............... 379/410, 402, 406, 411, 379/407, 408, 390; 370/24, 32, 32.1

[56] References Cited

U.S. PATENT DOCUMENTS

| | | | |
|---|---|---|---|
| 3,769,466 | 10/1973 | Von Pfeil et al. | 379/407 |
| 5,007,046 | 4/1991 | Erving et al. | 370/32.1 |
| 5,125,024 | 6/1992 | Gokcen et al. | 379/88 |

*Primary Examiner*—James L. Dwyer
*Assistant Examiner*—Jacques M. Saint-Surin
*Attorney, Agent, or Firm*—Cushman Darby & Cushman

[57] ABSTRACT

The operation of an echo canceller (4A to 4D) is controlled by a call control (2) of a telephone exchange over an internal control bus (3, 5) of the telephone exchange. The exchange then attends to the necessary signalling and the echo canceller does not need to know how the associated signalling is routed in the telephone network.

3 Claims, 1 Drawing Sheet

ARRANGEMENT FOR THE CONTROL OF AN ECHO CANCELLER

This is a continuation of application Ser. No. 08/081,322, filed on Jun. 23, 1993, now abandoned, which was abandoned upon the filing hereof.

FIELD OF THE INVENTION

The invention relates to an arrangement for the control of an echo canceller.

BACKGROUND OF THE INVENTION

End-to-end connections of a data transmission system, such as a telephone network, often show long transit time delays, in consequence of which echo is observed, for instance, in the case of normal speech, when a signal is reflected from the far end of a connection back to the talker. An echo canceller is an analog or digital device for processing a signal, such as a speech signal, which device is used for reducing echo by subtracting estimated echo from the echo (signal) occurring in a connection.

However, echo cancellation cannot be used in all cases, as for instance:

1) in connection with establishing a speech connection during multifrequency signalling (DTMF) in a telephone channel. Simultaneously transmitted signals produce a double talk situation and operation of an echo canceller would cause undesired changes in the signalling.
2) during a data transmission effected as a continuous bit flow in a telephone channel, because the bit flow must get through unchanged at original transfer rate.
3) during a data transmission effected by means of a baseband modem in a telephone channel.
4) during automatic testings and measurings of a speech connection. For accurate results, the echo cancellation must be switched off.
5) If there are several echo cancelling devices in a speech connection, only the echo cancellers at the ends of the connection are used and operation of the intermediate echo cancellers is disabled.

In order that echo cancellers along a connection can be switched on and off in appropriate situations, they must be capable of monitoring channel-associated or common channel signalling to observe the commands relating to the echo cancelling. In the case of channel-associated signalling, polarities of bits a and c of line signalling (T16) can be used to control the echo cancellet. Also, in common channel signalling, particular signals have been reserved for the control of the echo canceller, but for the identification of the signals, the echo cancellet must be provided with a common channel signalling terminal. It will be especially difficult to control the echo cancellet, if a common channel signalling time slot is routed along a path different from that of the speech itself.

SUMMARY OF THE INVENTION

The object of the invention is to provide a new arrangement for the control of an echo canceller.

An arrangement for the control of an echo canceller according to the invention is characterized in that the echo canceller is under direct control of a call control of a telephone exchange over an internal control connection of the telephone exchange.

The basic idea of the invention is to integrate the echo canceller into the telephone exchange in such a way that the echo canceller can be controlled internally within the telephone exchange under the call control. Then the exchange attends to the necessary signalling and controls the echo canceller by internal control. Due to this, all devices and operations associated with channel signalling can be omitted in the echo canceller, which does not need to know how the signalling is routed. Additionally, the internal control of the telephone exchange enables a more accurate timing and a more effective operation of the echo canceller at various stages of a call.

BRIEF DESCRIPTION OF THE DRAWING

The invention will be explained in the following in greater detail by means of a preferred embodiment with reference to the attached drawing, in which.

DETAILED DESCRIPTION OF THE INVENTION

Figure 1:
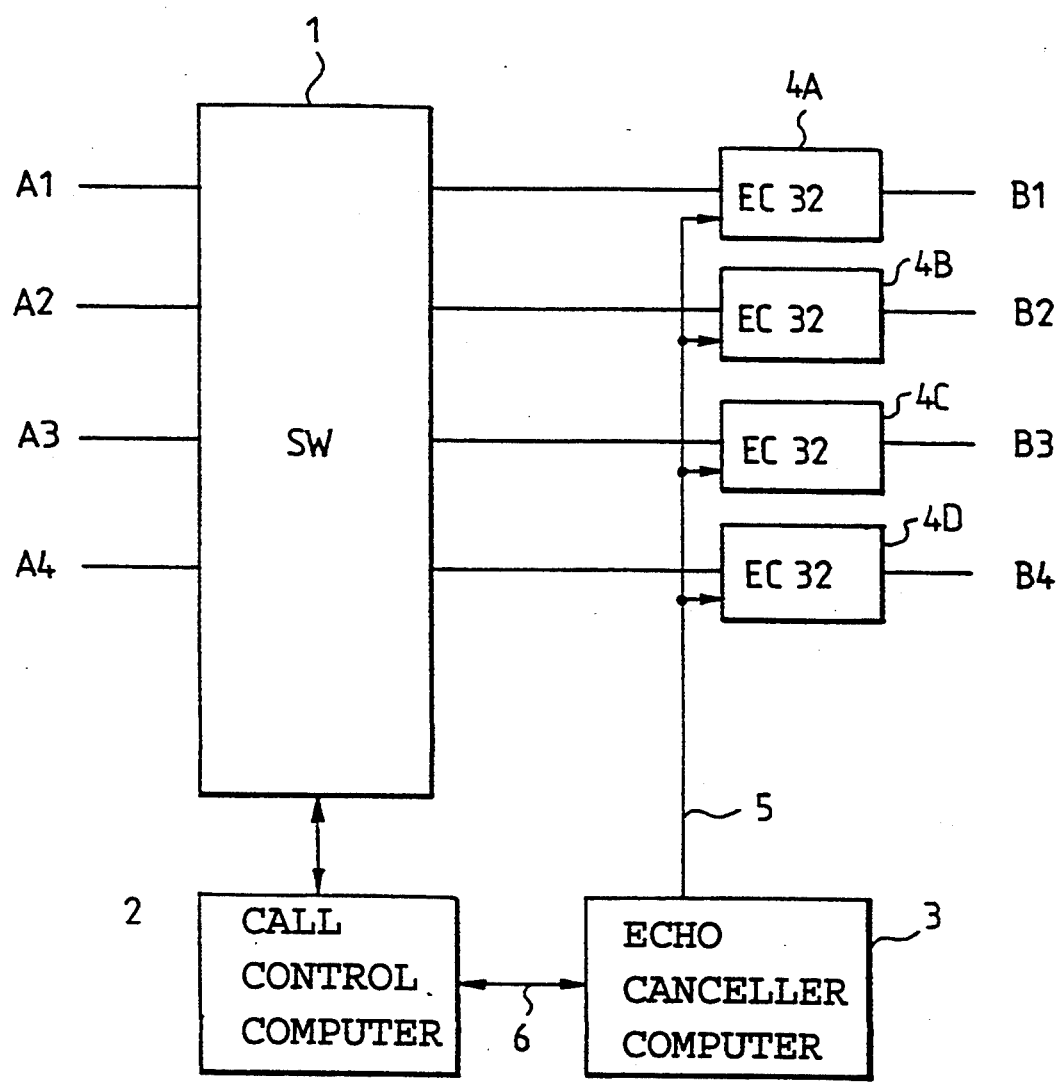
FIG. 1 shows an illustrating block diagram of an arrangement according to the invention, in which the echo cancellers are integrated into the telephone exchange.

The arrangement of the invention can be applied in connection with a telephone exchange and an echo canceller of any type. FIG. 1 shows a telephone exchange comprising four near end lines A1 to A4 and four far end lines B1 to B4, preferably 2,048 Mbit/s PCM lines according to CCITT recommendation G.703, each line having 32 channels, 30 of which are telephone channels. Between the channels of the lines A1 to A4 and the channels of the lines B1 to B4, it is possible to switch transmission connections (calls) over a digital switching unit 1 in a manner known per se. The operation of the telephone exchange is controlled and monitored by a call control computer 2. The exchange naturally also includes devices and software relating to the signalling to be used each time.

To each PCM line B1 to B4 of the far end is series-connected a respective echo cancelling unit, 4A to 4D, which carries out the echo cancellation of each channel of the respective PCM line separately, the channels being 32 in number in the examplary case. Each echo cancelling unit 4A to 4D can thereby effectively include a separate echo canceller for each channel. The operation of the echo cancellers 4A to 4D, especially switching on and off, is controlled by a computer 3, over a common control channel 5, within the telephone exchange. The operation of computer 3 is controlled by the call control computer 2, over a control channel 6. The control computer 3 thus provides an interface between the call control 2 and the echo cancelling units 4A to 4D. The control computer 3 comprises a software program knowing the control time slots of each echo cancelling unit 4A to 4D in the time-shared control channel 5 and delivers the commands for switching on and off the echo cancellation from the call control to respective echo cancelling units within the time slots over the channel 5. On the other hand, the call control computer 2 produces the commands for the control of the echo cancellers on the basis of the echo cancellation signalling received or possibly on the basis of other call status data available to the call control, such as the answering of the called subscriber (off hook).

Normally the echo cancellets 4A to 4D are always on, and therefore, the call control 2 does not usually need to control them. However, if a connection is established for instance in an international network having echo cancellers, the call control 2 switches off the echo canceller internally within the telephone exchange over the control computer 3 and the control channel 5. After the call, the call control 2 commands the echo canceller in question back to normal mode of operation for next call.

The drawing FIGURE and the related description are only intended to illustrate the present invention. As to the details, the method of the invention can vary within the scope of the attached claims.

We claim:

1. A digital telephone exchange having echo cancellers integrated therewith, comprising:
    a telephone exchange including a plurality of near end lines and a plurality of far end lines effectively served by a switching unit capable of providing transmission connections among selected plural ones of said plurality of near end lines and said plurality of far end lines;
    a call control computer operatively associated with said telephone exchange for controlling and monitoring operation of said telephone exchange;
    a plurality of echo cancellers at said telephone exchange, including a respective echo canceller series-connected to each of said plurality of far end lines;
    a control system at said telephone exchange for operating each of said plurality of echo cancellers and particularly for switching each of said plurality of echo cancellers on and off, said control system effectively connecting said plurality of echo cancellers with said call control computer for effecting control of operation of said echo cancellers by said call control computer.

2. A digital telephone exchange having echo cancellers integrated therewith according to claim 1, wherein said control system includes:
    an echo canceller operating computer for operating each of said plurality of echo cancellers, and particularly for switching each of said plurality of echo cancellers on and off;
    a first control separate channel effectively connecting said echo canceller operating computer with each of said plurality of echo cancellers, at said digital telephone exchange, for use in switching each of said plurality of echo cancellers on and off; and
    a second separate control channel effectively connecting said call control computer with said echo canceller operating computer, for effecting operation of said echo canceller operating computer by said call control computer.

3. A digital telephone exchange having echo cancellers integrated therewith, comprising:
    a digital telephone exchange including a plurality of near end lines and a plurality of far end lines effectively served by a switching unit capable of providing transmission connections among selected plural ones of said plurality of near end lines and said plurality of far end lines;
    a call control computer operatively associated with said telephone exchange for controlling and monitoring operation of said telephone exchange;
    a plurality of echo cancellers at said telephone exchange, including a respective echo canceller series-connected to each of said plurality of far end lines;
    an echo canceller operating computer for operating each of said plurality of echo cancellers, and particularly for switching each of said plurality of echo cancellers on and off;
    a first separate control channel effectively connecting said echo canceller operating computer with each of said plurality of echo cancellers, at said telephone exchange, for use in switching each of said plurality of echo cancellers on and off; and
    a second separate control channel effectively connecting said call control computer with said echo canceller operating computer, for effecting operation of said echo canceller operating computer by said call control computer.

* * * * *

UNITED STATES PATENT AND TRADEMARK OFFICE
CERTIFICATE OF CORRECTION

PATENT NO. : 5,450,487
DATED : September 12, 1995
INVENTOR(S) : LÄHDEMÄKI et al.

It is certified that error appears in the above-indentified patent and that said Letters Patent is hereby corrected as shown below:

On the title page, item [63] should read --PCT/FI92/00288 filed October 28, 1992 is a continuation of Ser. No. 81,322, June 23, 1993, abandoned.--

Signed and Sealed this

Thirtieth Day of July, 1996

Attest:

BRUCE LEHMAN

*Attesting Officer*

Commissioner of Patents and Trademarks